July 30, 1940.   J. C. KOONZ   2,209,820
ELECTRICAL CONDENSER AND METHOD OF MANUFACTURE
Filed Dec. 2, 1937   2 Sheets-Sheet 1
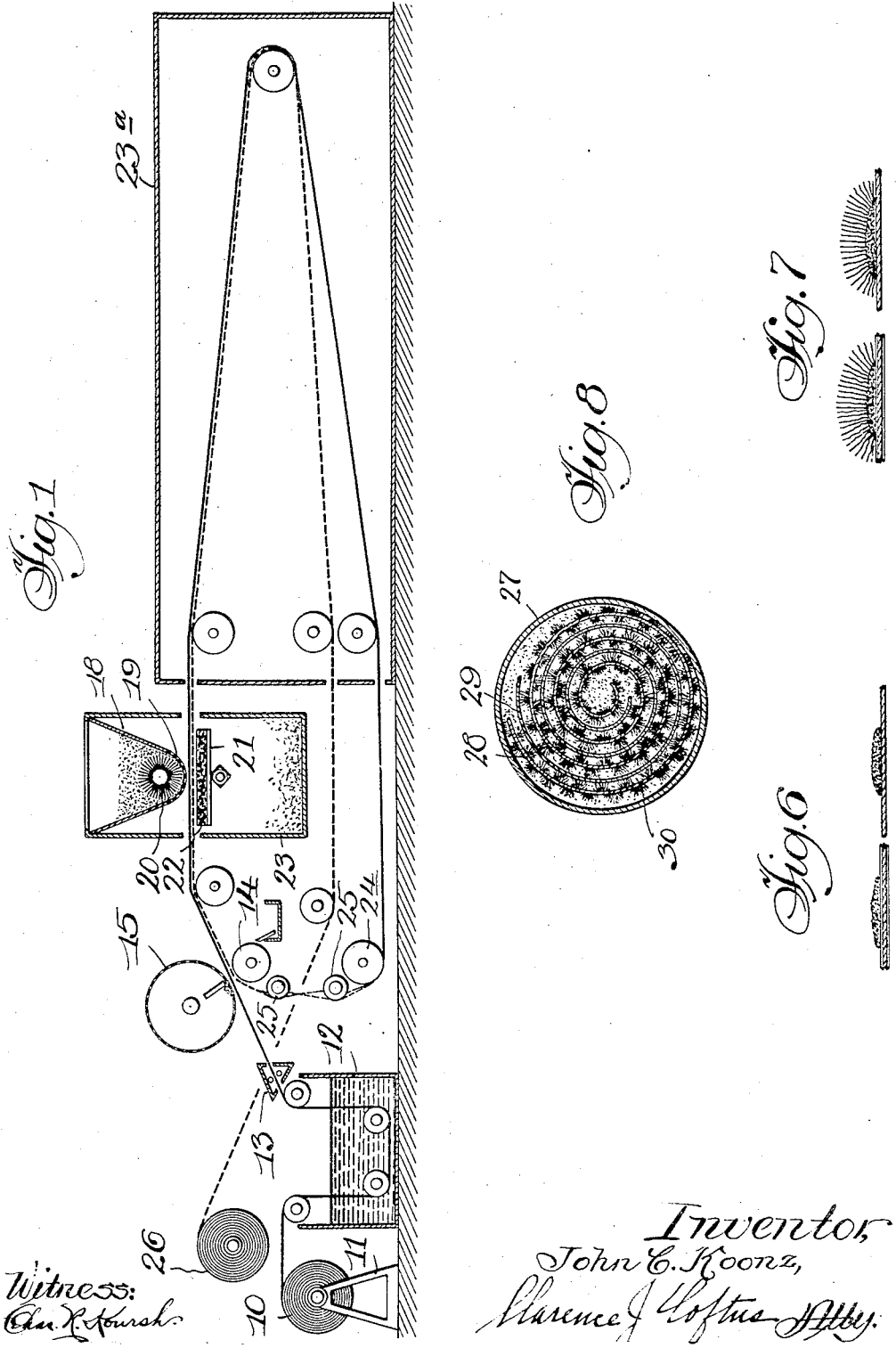
Inventor,
John C. Koonz, July 30, 1940.                J. C. KOONZ                  2,209,820
            ELECTRICAL CONDENSER AND METHOD OF MANUFACTURE
                      Filed Dec. 2, 1937           2 Sheets-Sheet 2
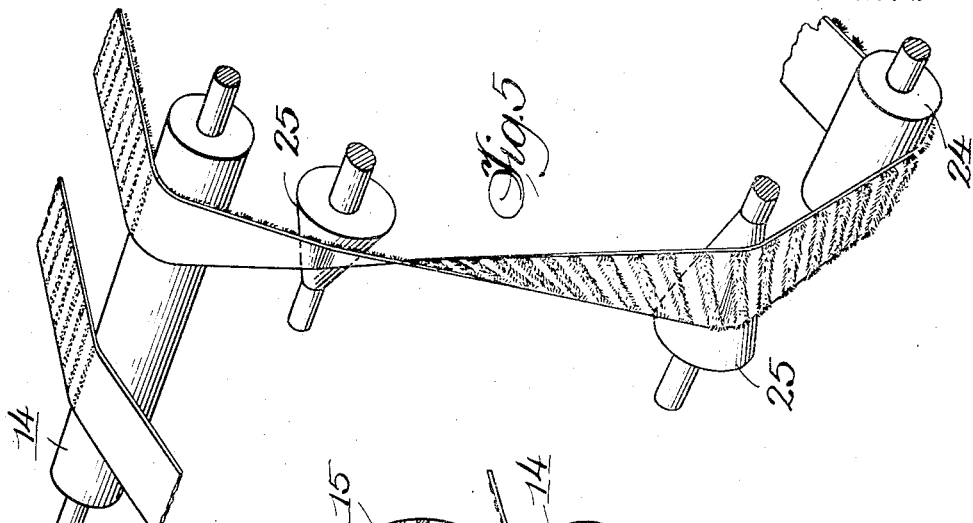
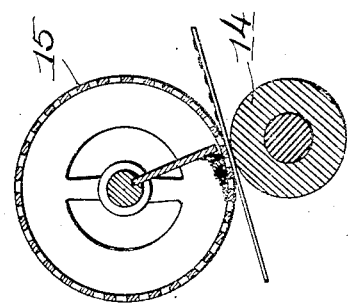
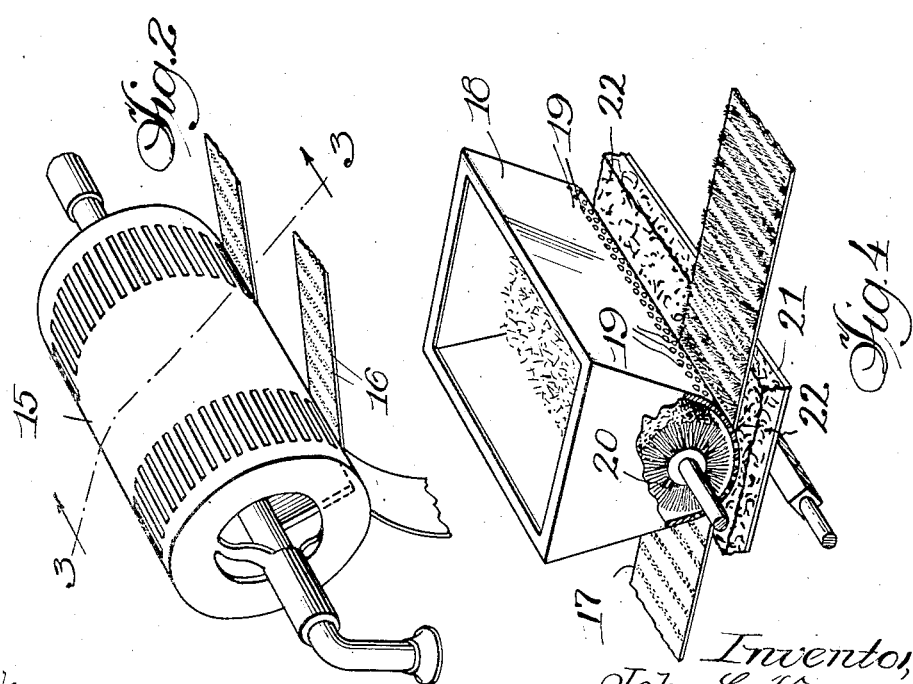
Inventor,
John C. Koonz, Patented July 30, 1940

2,209,820

UNITED STATES PATENT OFFICE 2,209,820

ELECTRICAL CONDENSER AND METHOD OF MANUFACTURE

John C. Koonz, Fort Wayne, Ind., assignor, by mesne assignments, to The Magnavox Company, Incorporated, a corporation of Indiana Application December 2, 1937, Serial No. 177,661

8 Claims. (Cl. 175—315)

My present invention relates to that class of electrical condensers utilizing in their construction ribbons of foil and the method of manufacture.

The principal object of my invention is to produce an efficient dry condenser which eliminates entirely the use of strips of paper, gauze or similar material by initially and integrally providing a composite foil which inherently contains its own separator.

It is a further object of my invention to initially provide before rolling a composite foil of aluminum, an organic polybasic acid, polyhydric alcohol resinous condensation product and flock for electrical condensers.

Heretofore dry condensers have been made with a separator of strips of paper, gauze or the like, impregnated prior to rolling. They have also been constructed by concomitantly rolling ribbons of foil together with separating strips of paper, gauze and the like and thereafter impregnating the strips with electrolyte by the centrifuge method.

With both forms or methods the paper and/or gauze separators must be kept in line with the anode and cathode foils or ribbons. If this is not done direct leakage between the electrodes may occur because the mechanical separator will not be in alignment with the anode and cathode foils.

If the separators are impregnated before rolling it is difficult to roll with the foil without disrupting the saturated, weakened paper.

By my method of initially and integrally providing a ribbon of foil with its own separating zone of flock, such as ground or finely cut cotton or other suitable cellulosic material I provide an electrical condenser which solves the long existing problem inherent in the prior structures and provides many marked advantages over electrical condensers heretofore used. Among other things it affords a separator which is as strong as the foil because it is in effect an integral part thereof. It eliminates entirely the trouble due to the breaking, sliding and buckling of the paper strips on the foil. It permits winding of the condensers at as high speed as the foil itself will permit, thus greatly reducing the cost of manufacturing condensers.

With my invention it is necessary to keep only two foils aligned as distinguished from the old troublesome method of attempting to keep in alignment two foils plus the separating strips or sheets of paper, gauze or the like. It permits efficient, quick and complete centrifuging or impregnation of the condenser with electrolyte after rolling. It insures uniform and consistent results, lower manufacturing cost and eliminates the troubles heretofore inherent in the prior condensers.

The above and other features, advantages and capabilities will become apparent from the detailed description of the acompanying drawings in which I have illustrated one form of my improved condenser and method of manufacture.

Fig. 1 is a vertical sectional view illustrating an apparatus for carrying out my method with the raw foil and the finished foil rolls shown in elevation.

Fig. 2 is a perspective view of the means for applying the adhesive or coating compensation to the foil.

Fig. 3 is a cross sectional view on the line 3—3 of Fig. 2.

Fig. 4 is a perspective view of the flock container and cooperating means for applying the flock to the foil showing a portion of the ribbon of foil immediately before and after the flock has been applied.

Fig. 5 is a diagrammatic view of the roller arranged for turning the ribbon after one side thereof has been treated so that the reverse side may be similarly treated.

Fig. 6 is an enlarged view of a fragmentary portion of the foil after the strips of adhesive or coating compensation have been applied.

Fig. 7 is an enlarged detail fragmentary view in cross section of the foil after the flock has been applied.

Fig. 8 is a sectional view of a preferred form of my improved condenser.

Referring to the drawings in detail it will be readily seen that I have provided a continuous method or process for initially converting a ribbon of raw foil into a finished foil in effect integrally provided with its own seperating zone before rolling. In other words with my method I provide a composite foil which when made into an electrical condenser entirely eliminates the use of separators of sheets of papers, gauze and the like as the composite foil provides its own separator.

In carrying out my method or process I initially start with a roll of raw foil 10 preferably aluminum, rotatably mounted in a suitable support such as the standard 11. From this roll the foil is passed through a bath or suitable cleansing fluid in the tank or receptacle 12 for removing any objectionable foreign matter which may be carried on the foil. Generally the foil as it comes from the manufacturer contains or carries on its surface foreign matter. Unless this foreign matter is removed serious objections may result in the finished condenser, for example corrosion. Further, this foreign matter may interfere with the application of some of the remaining steps, such as preventing the adhesive or coating, comprising an organic polybasic acid, polyhydric alcohol resinous condensation product, and flock from properly welding with the foil. As a result the flock is apt to come off or slip and allow one electrode to contact the other, resulting in a shorted condenser rendering it inoperative for the purpose intended. While I have shown a liquid bath for cleansing the raw foil the foil may also be treated for the same purpose in a hot vapor bath, in which case the vapor condenses on the foil and removes any objectionable foreign matter.

The next step after the foil has been treated as heretofore described and for the purposes stated it is important that it be dried before subjected to the next successive step, therefore, the foil is continuously passed from the bath treatment, whether it be liquid or vapor, through a suitable dryer 13. The reason for drying is that if the foil is wet the adhesive or coating may not properly integrate with the foil; also if the adhesive or coating is applied to the foil wet volatile matter may be trapped which would later be injurious to the condenser and render it inefficient for its intended purpose.

From the dryer 13 the foil is continuously passed between a backing roller 14 and a rotatable screen 15. Inside the rotatable screen 15 is a stationary squeegee, best shown in Fig. 2, connected and arranged by suitable means to force through the openings in the screen and deposit the adhesive or coating composition on the foil in the form corresponding to the predetermined openings in the screen. These openings are, as best shown in Fig. 3, arranged parallel with the axis of the rollers around its circumference and longitudinally spaced apart. In the form shown the adhesive or coating is applied in spaced strips at right angles to the ribbon as shown at 16 and 17 of Figs. 2 and 4.

In the particular form shown I obtain very satisfactory results by arranging the openings so as to provide on the ribbon of the foil strips of about 40/1000 of an inch wide with the center lines of these strips of adhesive or coating being about 60/1000 inch apart. Of course, instead of the strips being arranged at right angles to the ribbons they could satisfactorily be arranged diagonally. By thus spacing the welding or impregnating strips this results in a finished condenser having part of the foil directly exposed to the electrolyte, therefore, giving a definite electrical connection between the electrodes through the medium of the electrolyte.

The roller 14, as shown in Fig. 1, is provided with a scraper and receptacle for removing and collecting any excess adhesive or coating.

The next step consists in continuously passing the foil from the adhesive or coating applying means to and through the flock applicator.

The flock applicator consists of a flock container 18 in which is carried a supply of ground or finely cut cotton, rayon or similar cellulosic material. The bottom of the container is provided with suitably spaced screens 19 immediately over the paths of travel of the ribbon foil. Within the flock container 18 is rotatably mounted on a suitable standard (not shown) a rotating brush 20 driven by any suitable means. This brush when rotated causes the ground or finely cut flock to pass through the openings in the screen causing the flock to intermesh and interlock with the previously prepared DuLux portions of the foil ribbon and in effect become an integral part thereof. Adjacent and below the container 18 is a metal plate 21 suitably supported, carrying a sponge rubber pad 22 on which the foil travels during its continuous passage through the flock applicator. This metal plate with its rubber pad is rapidly vibrated causing the flock to assume a vertical or edgewise position while being fused or formed with the foil. The plate is vibrated by any suitable means. In the form shown I have illustrated a four-sided shaft in cross section which is rotated at about 1800 R. P. M.

The flock only intermeshes, fuses or welds with the foil at the points where the adhesive or coating has previously been applied. So much of the flock which passes through the container to the foil but does not fuse or intermesh therewith is collected in the bottom chamber 23 of the flock application.

As the flock is being supplied by means of the rotating brush to the ribbon foil the foil is rapidly vibrated for the purpose of causing the finely cut flock to assume what might be termed a position at right angles to the plane of the foil as best shown in Figs. 4 and 7, in the latter figure on an exaggerated scale to more clearly bring out the point. Any suitable vibrator, of course, may be used instead of the form diagrammatically shown in Fig. 1. In other words by means of the step of vibrating the foil concurrently with the welding of the flock to the foil the finely cut flock, which is preferably cut to a predetermined, definite length, is in effect caused to stand on end and with the flock thus standing on end a composite separator zone is provided with a definite, predetermined thickness. In other words with this arrangement the thickness of the separator zone is determined by the length of the flock particles. After the flock has thus been welded to the foil it is immediately and continuously passed into, through and out of a drying oven 23a of any suitable form over rollers as shown. I have found very satisfactory results have been obtained by maintaining a temperature in the oven of about 275° F. and subjecting the foil to such temperature for about thirty minutes. Therefore the distance and the speed of travel are preferably so arranged that the foil is subjected to such temperature for the length of time stated. This can be done in any suitable manner. In the form shown I pass it through a long oven at a slow rate of travel.

After the foil has been thus heat treated the foil is then continuously passed from the oven over a roller 24 and thence over a pair of opposed, spaced cone shaped rollers 25 for turning the foil ribbon to present the under or untreated surface to the same treatment as the opposite surface by again passing the foil continuously through the successive steps of the process as heretofore described. The foil travels from the second cone shaped roller 25 over the roller 14 and under the adhesive or coating applicator at a point spaced from and parallel with the ribbon foil making its first trip through the process and from there through the flock applicator and continuously on through the furnace travelling at all times in a parallel but spaced path with the ribbon foil making its initial trip through the process. From the oven the foil thus treated on both sides is cooled by passing it to a suitable drum where it is wound in finished foil coils 26 ready for rolling into a condenser and used without separate strips of paper or gauze.

The foil thereafter is passed directly from the finished foil coil and rolled into a condenser, such for example as shown in Fig. 8, by any suitable coil winding machine. When wound the condenser is provided with a suitable electrolyte by the centrifuge method or by impregnating before rolling.

The condenser shown in Fig. 8 comprises a containing vessel 27, a composite foil 28 integrally provided on both surfaces with a separating zone and a foil 29 rolled together. In Fig. 8 the spacing of the rolled foil is somewhat exaggerated for the sake of clearness for in practice one will be tightly rolled on the other leaving a slight space between due to the integral separator. After rolling the coil is impregnated with a suitable electrolyte 30.

With the separators heretofore used, such as gauze and/or paper, the path of the electrolyte in forcing out the air and being absorbed by the separator encountered a relatively high resistance to its travel whereas with my invention the path of travel during the centrifuging is always radial with respect to the center of the centrifuge and parallel to the axis of the condenser roll thereby permitting an extremely easy flow of electrolyte and uniform and complete impregnation.

It must be seen that as a result of my method the foil, adhesive or coating and flock integrate or become integral forming a composite foil comprising aluminum, adhesive or coating and flock, thus entirely eliminating the use in condensers of separate sheets of paper, gauze or the like for separators as the composite foil provides its own separator.

The condenser in its finished form is provided with suitable contacts for the electrodes and the receptacle is, of course, sealed by any suitable means.

With my invention by thus forming in effect the separator integrally with the foil the condensers can be wound at a relatively high speed without danger and with assurance of uniformity in the finished product.

It further greatly facilitates manufacture of the condenser as it is necessary to keep only two foils aligned. Further, in order to provide separators of varying thickness it is only necessary to carry a stock of flock of different lengths, i. e., a length of flock for all thicknesses of separators desired. Regardless of whether cotton or rayon is used, with the separator formed integrally with the flock and at an angle to the length of the ribbon or foil, the centrifuging is more quickly, more uniformly and more perfectly carried out and with much less expense than in the old condensers.

Moreover by thus forming the separators of the flock considerable expense is saved over the use of gauze or paper and on the whole a more uniform product is obtained.

It is more difficult to obtain proper impregnation of the roll with the use of separators such as paper, gauze and the like. All these disadvantages and objections are overcome with my invention.

While I have in my preferred form specified as a coating or adhesive an organic polybasic acid, polyhydric alcohol resinous condensation product, other suitable or similar material may be used in combination with cellulosic material for forming my composite foil.

Having thus described my invention I claim:

1. An electrolytic condenser including an electrode comprising a roll of foil having spaced zones of finely cut cellulosic flock affixed thereto and an electrolyte.

2. As an article of manufacture for use in electrolytic condensers, a ribbon of foil provided on its opposite faces with spaced zones of finely cut flock secured thereto.

3. In an electrolytic condenser, a containing vessel, an electrode therein consisting of suitable foil provided with spaced zones of finely cut cellulosic flock secured to the foil and an original electrolyte in said vessel.

4. In an electrolytic condenser, a containing vessel, an electrode therein consisting of suitable foil provided with a fixed, predetermined separator of finely cut cellulosic material spaced apart throughout the length of the foil, and means for anchoring said material to the foil.

5. The method of manufacturing foil for use in electrodes for electrical condensers which consists in forming with the foil spaced zones of finely cut cellulosic material and then heat treating the foil supplied with the cellulosic material in a heating zone for a period of about thirty mintes at a temperature of about 275° F.

6. An electrical condenser which eliminates the use of separating sheets of paper, gauze or the like, comprising in combination an anode and cathode, one of which is provided with spaced zones of finely cut cellulosic flock secured thereto, and an original electrolyte.

7. An article of manufacture for use in electrolytic condensers comprising a ribbon of foil provided with finely cut flock secured on the foil in edgewise position.

8. An electrolytic condenser including a containing vessel, an electrode therein consisting of a ribbon comprising a suitable foil, an adhesive applied to spaced zones of the foil and cellulosic flock of a predetermined length initially secured to the adhesive, and an original electrolyte in said vessel.

JOHN C. KOONZ.